United States Patent
Kaeriyama et al.

(10) Patent No.: US 6,775,442 B2
(45) Date of Patent: Aug. 10, 2004

(54) INTERNAL UNIT AND SUBMARINE APPARATUS HAVING SYSTEM-UNIT COUPLING BARS POSITIONED AWAY FROM A PRINTED BOARD

(75) Inventors: Yasushi Kaeriyama, Sapporo (JP); Hiroshi Nakashima, Kawasaki (JP); Taiichi Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 09/960,502

(22) Filed: Sep. 24, 2001

(65) Prior Publication Data

US 2002/0164134 A1 Nov. 7, 2002

(30) Foreign Application Priority Data

May 2, 2001 (JP) ......................................... 2001-135502

(51) Int. Cl.[7] ............................. G02B 6/44; G02B 6/00
(52) U.S. Cl. ...................................... 385/101; 385/147
(58) Field of Search ................................ 385/101, 122, 385/133, 134, 147

(56) References Cited

U.S. PATENT DOCUMENTS

| | | | | |
|---|---|---|---|---|
| 5,412,497 A | * | 5/1995 | Kaetsu et al. ................ | 398/164 |
| 5,689,406 A | * | 11/1997 | Wood et al. ................. | 361/796 |
| 6,320,744 B1 | * | 11/2001 | Sullivan et al. ............. | 361/685 |
| 6,600,865 B2 | * | 7/2003 | Hwang ........................ | 385/134 |

FOREIGN PATENT DOCUMENTS

JP          6-273634          9/1994

* cited by examiner

*Primary Examiner*—Chandrika Prasad
(74) *Attorney, Agent, or Firm*—Staas & Halsey LLP

(57) ABSTRACT

An internal unit is incorporated in a body of a submarine apparatus. The internal unit comprises a plurality of system units placed in a predetermined arrangement, and coupling bars fixed to coupling-bar fixing surfaces of the system units by screws so as to couple the system units in the predetermined arrangement. The system units include at least one electronic-circuit printed board having a part to be adjusted. The coupling-bar fixing surfaces are located at positions shifted from the electronic-circuit-printed board.

40 Claims, 17 Drawing Sheets

INTERNAL UNIT AND SUBMARINE APPARATUS HAVING SYSTEM-UNIT COUPLING BARS POSITIONED AWAY FROM A PRINTED BOARD

BACKGROUND OF THE INVENTION

1. Field of the Invention

The present invention generally relates to an internal unit and a submarine apparatus having the internal unit and, more particularly, to an internal unit in a submarine apparatus, and a submarine apparatus provided along a submarine cable together laid on a seafloor.

The "submarine apparatus" means an apparatus laid on a seafloor, such as a submarine repeater, a submarine branching unit, or a gain equalizer.

Currently, in a market of submarine-apparatus, it has been required that a submarine apparatus is delivered to a customer in a shorter period since making a contract with the customer. Therefore, a submarine apparatus is required to be manufactured in a shorter period.

FIG. 1 shows a structure of a general submarine repeater 10. The submarine repeater 10 comprises a cylindrical airtight body 11 that can endure a water pressure on a seafloor, and a cylindrical internal unit 12 incorporated therein. The airtight body 11 comprises a cylindrical outer body 13 and end-surface plates 14 and 15 covering both ends of the outer body 13. The internal unit 12 is incorporated within the outer body 13 with a buffering member 16 formed of a mesh plate being placed therebetween. The buffering member 16 has a function of conducting heat generated by the internal unit 12 to the airtight body 11, and also has a function of keeping the internal unit 12 from suffering vibrations and impacts caused during the laying of the submarine repeater 10.

The submarine repeater 10 is connected with a submarine cable 20. The submarine cable 20 includes an optical fiber 21 transmitting information, and an electric-supply line 22 supplying electric power. The optical fiber 21 and the electric-supply line 22 are drawn into the airtight body 11 via a hole formed in the end-surface plate 14 or 15 so as to be connected with the internal unit 12.

In manufacturing the submarine repeater 10, it takes a lot of steps to assemble the internal unit 12.

2. Description of the Related Art

FIG. 2 to FIG. 6 show a conventional internal unit 30 of a submarine repeater. In FIG. 2 to FIG. 6, circuit units are stacked in a horizontal direction. X indicates a horizontal direction, Z indicates a vertical direction, and Y indicates a depth direction (a longitudinal direction of the internal unit 30). FIG. 2 shows a disassembled state of roughly a front half (in a direction Y2) of the internal unit 30. FIG. 3 is a front view of the internal unit 30, as seen from Y2. FIG. 4 is a plan view of the internal unit 30, as seen from Z1. FIG. 5 is a bottom view of the internal unit 30, as seen from Z2. FIG. 6 is a side view of the internal unit 30, as seen from X1.

The internal unit 30 mainly comprises a plurality (for example, four) of system units 31-1, 31-2, 31-3 and 31-4, four coupling bars 32-1, 32-2, 32-3 and 32-4, covers 34-1 and 34-2, an insulating cylinder 35, and end-surface covers 36.

The system unit 31-1 comprises an optical circuit unit 40 having an optical circuit component, a monitor/power-supply circuit unit 42 including a printed board 41 for address-setting, a control circuit unit 44 including a printed board 43 for adjusting, and a lid member 45 made of metal. The optical circuit unit 40, the monitor/power-supply circuit unit 42 and the control circuit unit 44 are stacked in this order in a direction X2-X1, and the lid member 45 covers the outer surface of the control circuit unit 44. Each of the circuit units 40, 42 and 44 is made of metal, and has a box shape with the outer surface being open. The other system units 31-2 to 31-4 have the same or symmetrical structure as the above-described system unit 31-1.

The first system unit 31-1 and the second system unit 31-2 are fixed to each other by insulating coupling plates 46 and screws with an insulating sheet 47 therebetween so that the optical circuit units 40 of the first system unit 31-1 and the second system unit 31-2 face each other in a direction X1-X2. Likewise, the third system unit 31-3 and the fourth system unit 31-4 are fixed to each other so that the optical circuit units 40 of the third system unit 31-3 and the fourth system unit 31-4 face each other in the direction X1-X2. The first system unit 31-1 and the third system unit 31-3 are aligned in a direction Y2-Y1, and the second system unit 31-2 and the fourth system unit 31-4 are aligned in the direction Y2-Y1.

A plane 50 and a plane 51 are formed in directions Z1 and Z2, respectively, by side surfaces of the optical circuit units 40 facing each other as described above. As shown in FIG. 4, the optical fiber 21 is wired along a groove 50a in the plane 50, and is contained in the groove 50a with an excess length thereof being processed. As shown in FIG. 5, the electric-supply line 22 is wired along the plane 51.

The coupling bars 32-1, 32-2, 32-3 and 32-4 are narrow boards arranged at every 90 degrees so as to couple and fix the system units 31-1, 31-2, 31-3 and 31-4, and to conduct heat outwardly from the system units 31-1, 31-2, 31-3 and 31-4.

The first coupling bar 32-1 extends along the lid members 45 of the first and third system units 31-1 and 31-3, and is fixed to the lid members 45 by screws 52 with an insulating sheet 56 therebetween. The second coupling bar 32-2 extends along the lid members 45 of the second and fourth system units 31-2 and 31-4, and is fixed to the lid members 45 by screws 53. The third coupling bar 32-3 extends along the plane 50, and is fixed to the side surfaces (in the direction Z1) of the optical circuit units 40 of the system units 31-1, 31-2, 31-3 and 31-4 by screws 54. The third coupling bar 32-3 covers the optical fiber 21 contained in the groove 50a. The fourth coupling bar 32-4 extends along the plane 51, and is fixed to the side surfaces (in the direction Z2) of the optical circuit units 40 of the system units 31-1, 31-2, 31-3 and 31-4 by screws 55. The fourth coupling bar 32-4 covers the electric-supply line 22 wired on the plane 51.

By the coupling bars 32-1, 32-2, 32-3 and 32-4 and the screws 52 to 55, the four system units 31-1, 31-2, 31-3 and 31-4 are fixed at predetermined positions. Each of the screws 52 to 55 is fastened via an insulating bush 57. Heads of the screws 52 to 55 are covered with insulating caps 58 to 61, respectively. The insulating caps 58 to 61 are inserted into holes 62 for screwing formed in the coupling bars 32-1, 32-2, 32-3 and 32-4.

Each of the covers 34-1 and 34-2 is semi-cylindrical, and the covers 34-1 and 34-2 cover the system units 31-1 to 31-4 from the side Z1 and the side Z2, respectively. The covers 34-1 and 34-2 are fixed to the coupling bars 32-1 to 32-4 by screws 63 and 64. Fixing the covers 34-1 and 34-2 as above gives a cylindrical shape to the internal unit 30 in the course of being assembled.

The insulating cylinder 35 covers the covers 34-1 and 34-2 mounted on the internal unit 30 in the course of being assembled. The insulating cylinder 35 insulates the internal unit 30 from the outer body 13 in a state that the internal unit 30 is incorporated in the outer body 13.

Next, the internal unit 30 having the above-described structure is assembled as shown in FIG. 7 and FIG. 8. The assembling is performed while being verified by an inspector who is another person from an assembling operator so that reliability thereof is secured.

First, after making a contract with a customer and deciding on details of system parameters, assembling of the system units 31-1, 31-2, 31-3 and 31-4 begins. The optical circuit unit 40, the monitor/power-supply circuit unit 42 in which an address is set by operating the address-setting printed board 41, and the control circuit unit 44 are stacked, and properties thereof are adjusted by operating the adjusting printed board 43. Then, the lid member 45 is mounted thereon. This step prepares each of the system units 31-1 to 31-4 with the adjusted properties (step 70).

Next, the first system unit 31-1 and the second system unit 31-2 are combined to each other by the coupling plates 46, back to back, i.e., in such a manner that the optical circuit units 40 of the first system unit 31-1 and the second system unit 31-2 face each other. Also, the third system unit 31-3 and the fourth system unit 31-4 are combined to each other by the coupling plates 46, back to back, so that the optical circuit units 40 of the first system unit 31-3 and the second system unit 31-4 face each other (step 71).

The first coupling bar 32-1 and the second coupling bar 32-2 are fixed by the screws 52 and 53 (step 72).

Screw torques of the screws 52 and 53 are verified (step 73).

The optical fiber 21 is contained along the groove 50a in the plane 50 (step 74).

A containment state of the optical fiber 21 is verified (step 75).

The third coupling bar 32-3 is fixed by the screws 54 (step 76).

Screw torques of the screws 54 are verified (step 77).

The insulating caps 58 to 60 are mounted by inserting (step 78).

A mounting state of the insulating caps 58 to 60 is verified (step 79).

The cover 34-1 is fixed by the screws 63 (step 80).

Screw torques of the screws 63 are verified (step 81).

The electric-supply line 22 is contained along the plane 51 (step 82).

A containment state of the electric-supply line 22 is verified (step 83).

The fourth coupling bar 32-4 is fixed by the screws 55 (step 84).

Screw torques of the screws 55 are verified (step 85).

The insulating caps 61 are mounted by inserting (step 86).

A mounting state of the insulating caps 61 is verified (step 87).

The cover 34-2 is fixed by the screws 64 (step 88).

Screw torques of the screws 64 are verified (step 89).

Finally, the insulating cylinder 35 is inserted (step 90).

The verifying steps are performed by an inspector who is another person from an assembling operator, as mentioned above, during which the assembling steps are suspended.

The structure of the internal unit 30 requires an inspection in which a verification is performed for each of the assembling steps. Thus, the number of the verifying steps becomes large. This increases the number of times the assembling steps are suspended, lengthening manufacturing moves. Thus, it takes a long period of time to assemble the internal unit 30.

Since both the address-setting printed board 41 and the adjusting printed board 43 are incorporated in the system units 31-1 to 31-4, it is not possible to stop assembling the internal unit 30 in the course of the steps for a later completion. Therefore, after making a contract with a customer and deciding on details of system parameters, assembling of the internal unit 30 begins from the start by assembling the system units 31-1, 31-2, 31-3 and 31-4. Hence, it takes a long period of time to complete the internal unit 30 after making a contract with a customer.

Additionally, the system units 31-1 to 31-4 are covered with the lid members 45, and the first and second coupling bars 32-1 and 32-2 are fixed on the lid members 45 of the system units 31-1 to 31-4. Therefore, when the above-mentioned already set address needs to be changed after starting assembling the internal unit 30, some of the already assembled components need to be disassembled, and consequently be reassembled. Thus, it takes a longer period of time to complete the internal unit 30.

SUMMARY OF THE INVENTION

It is a general object of the present invention to provide an improved and useful internal unit and a submarine apparatus having the internal unit in which the above-mentioned problems are eliminated.

A more specific object of the present invention is to provide an internal unit and a submarine apparatus having the internal unit which can be assembled in a shortened period of time.

In order to achieve the above-mentioned objects, there is provided according to one aspect of the present invention an internal unit incorporated in a body of a submarine apparatus, the unit comprising:

a plurality of system units placed in a predetermined arrangement, the system units including at least one electronic-circuit printed board having a part to be adjusted; and coupling bars fixed to coupling-bar fixing surfaces of the system units by screws so as to couple the system units in the predetermined arrangement, wherein the coupling-bar fixing surfaces are located at positions shifted from the electronic-circuit printed board.

According to the present invention, in the state where the coupling bars are fixed to the coupling-bar fixing surfaces by the screws, the electronic-circuit printed board is accessible so as to adjust properties thereof after the coupling bars are fixed to the system units. Therefore, even before making a contract with a customer, the internal unit can be assembled to a certain step in the course of assembling. Then, after making the contract with the customer, the assembling of the internal unit can be resumed from the step. Hence, the internal unit can be assembled in a short period of time.

In order to achieve the above-mentioned objects, there is also provided according to another aspect of the present invention an internal unit incorporated in a body of a submarine apparatus, the unit comprising:

a plurality of system units placed in a predetermined arrangement, the system units including an optical-fiber containing portion containing an optical fiber, an electric-supply-line containing portion containing an electric-supply line, and at least one electronic-circuit printed board having a part to be adjusted; and coupling bars fixed to coupling-bar fixing surfaces of the system units by screws so as to couple the system units in the predetermined arrangement, wherein the coupling-bar fixing surfaces are located at positions shifted from the optical-fiber containing portion, the electric-supply-line containing portion, and the electronic-circuit printed board.

According to the present invention, in the state where the coupling bars are fixed to the coupling-bar fixing surfaces by the screws, the coupling bars do not cover the optical-fiber containing portion. Therefore, the containment state of the optical fiber does not have to be verified immediately after the optical fiber is contained in the optical-fiber containing portion, but only has to be verified, along with the screw torques of the screws, after the optical fiber is contained in the optical-fiber containing portion and the coupling bars are fixed to the coupling-bar fixing surfaces by the screws.

Additionally, according to the present invention, in the state where the coupling bars are fixed to the coupling-bar fixing surfaces by the screws, the coupling bars do not cover the electric-supply-line containing portion. Therefore, the containment state of the electric-supply line does not have to be verified immediately after the electric-supply line is contained in the electric-supply-line containing portion, but only has to be verified, along with the screw torques of the screws, after the electric-supply line is contained in the electric-supply-line containing portion and the coupling bars are fixed to the coupling-bar fixing surfaces by the screws.

Thus, the number of times the internal unit is transferred between assembling steps and verifying steps in the course of assembling is reduced, decreasing manufacturing moves of the internal unit. Therefore, the internal unit can be assembled in a short period of time.

Additionally, in one of the internal units according to the present invention, each of the system units may have inclined surfaces on both sides thereof; and the inclined surfaces may form the coupling-bar fixing surfaces.

According to the present invention, the coupling-bar fixing surfaces can be located at positions shifted from the optical-fiber containing portion, the electric-supply-line containing portion, and the electronic-circuit printed board in a rational manner.

Additionally, one of the internal units according to the present invention may further comprise a plurality of covers fixed to the coupling bars by screws so that each of the covers lies across the coupling bars adjacent in a circumferential direction, wherein the covers adjacent in the circumferential direction may be placed so as to form a gap therebetween, the gap being located at a position opposing each of the screws fixing the coupling bars.

According to the present invention, the screw torques of the screws fixing the coupling bars can be verified along with the screw torques of the screws fixing the covers, after the covers are fixed to the coupling bars by the screws.

In order to achieve the above-mentioned objects, there is also provided according to another aspect of the present invention a submarine apparatus comprising:

a cylindrical airtight body; and one of the internal units according to the present invention incorporated in the body.

According to the present invention, since manufacturing moves of the internal unit can be shortened, manufacturing moves of the submarine apparatus can accordingly be shortened. Therefore, the submarine apparatus can be manufactured in a short period of time.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 9:
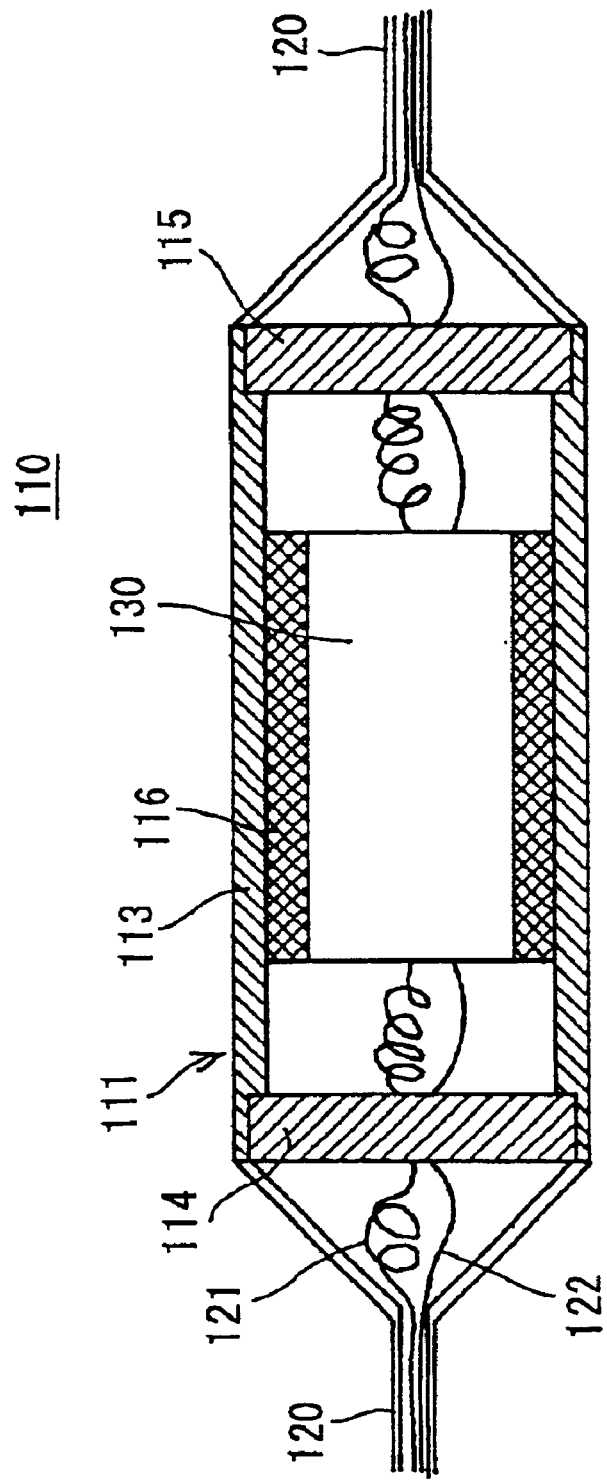
FIG. 9 shows a structure of a submarine repeater according to an embodiment of the present invention.
Figure 10:
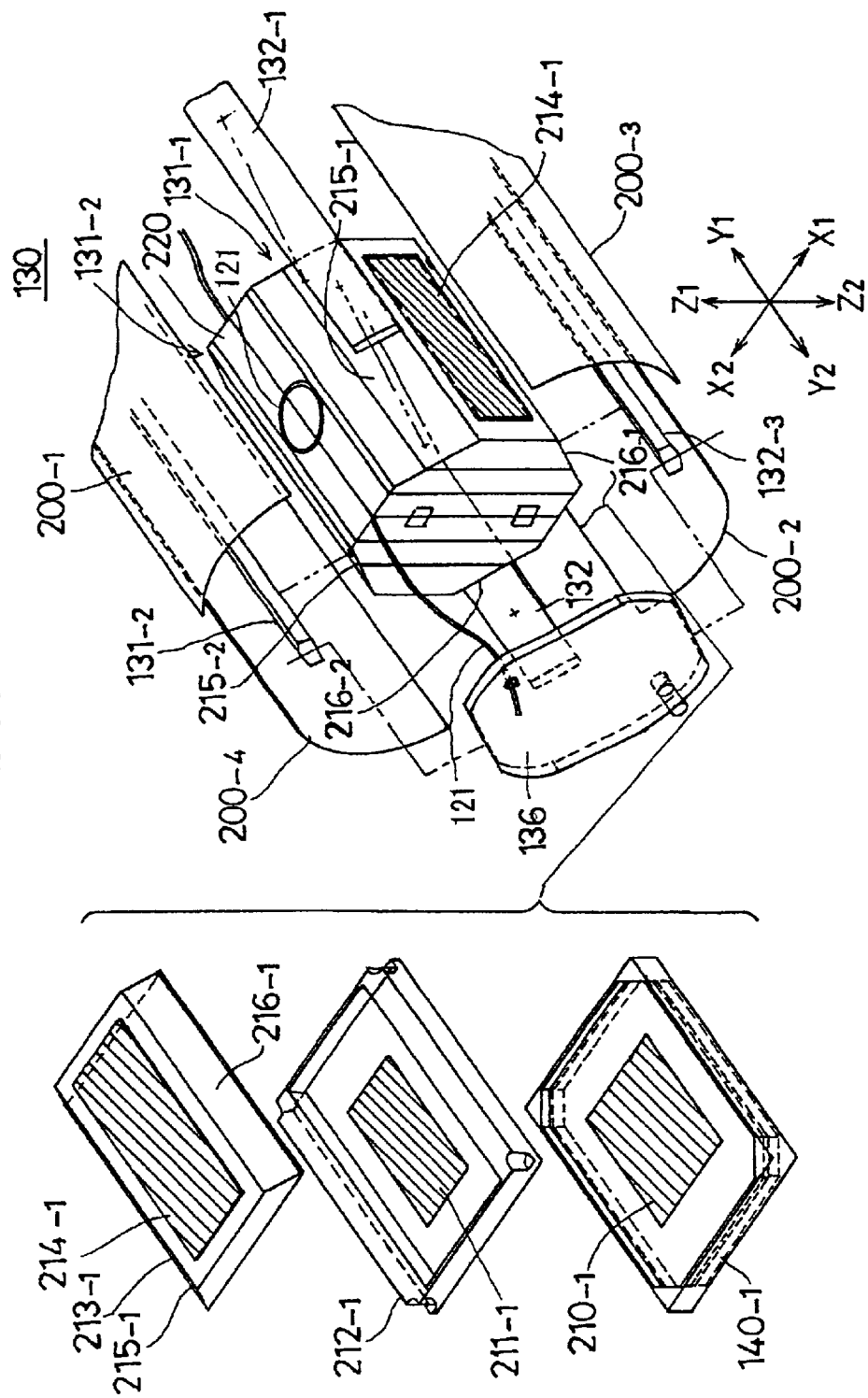
FIG. 10 is a perspective view of a disassembled state of an internal unit according to an embodiment of the present invention incorporated in the submarine repeater shown in FIG. 9.
Figure 11:
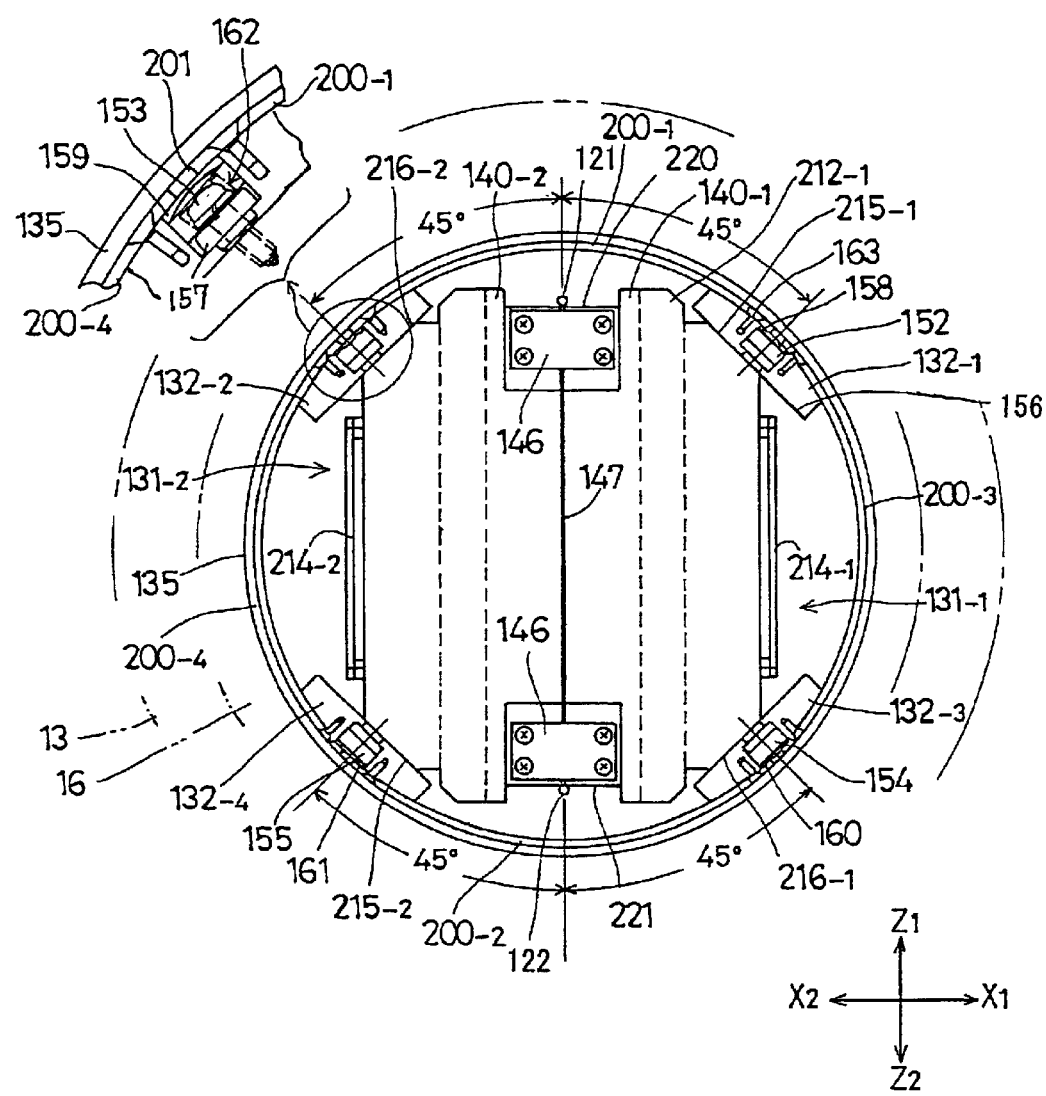
FIG. 11 is a front view of the internal unit shown in FIG. 10.

FIG. 9 shows a structure of a submarine repeater 110 incorporating an internal unit 130 according to an embodiment of the present invention. The submarine repeater 110 comprises a cylindrical airtight body 111 that can endure a water pressure on a seafloor, and the cylindrical internal unit 130 incorporated therein. The airtight body 111 comprises a cylindrical outer body 113 and end-surface plates 114 and 115 covering both ends of the outer body 113. The internal unit 130 is incorporated within the outer body 113 with a buffering member 116 formed of a mesh plate being placed therebetween. The buffering member 116 has a function of conducting heat generated by the internal unit 130 to the airtight body 111, and also has a function of keeping the internal unit 130 from suffering vibrations and impacts caused during the laying of the submarine repeater 110.

The submarine repeater 110 is connected with a submarine cable 120. The submarine cable 120 includes an optical fiber 121 transmitting information, and an electric-supply line 122 supplying electric power. The optical fiber 121 and the electric-supply line 122 are drawn into the airtight body 111 via a hole formed in the end-surface plate 114 or 115 so as to be connected with the internal unit 130.

FIG. 10 to FIG. 14 show the internal unit 130 according to the present embodiment incorporated in the submarine repeater 110 shown in FIG. 9. FIG. 10 to FIG. 14 correspond to FIG. 2 to FIG. 6, respectively, in terms of manners of views. The internal unit 130 has basically the same structure as the above-described internal unit 30. Thus, elements in FIG. 10 to FIG. 14 corresponding to the elements shown in FIG. 2 to FIG. 6 are referenced by reference numbers of the reference numbers in FIG. 2 to FIG. 6 plus 100.

The internal unit 130 mainly comprises a plurality (for example, four) of system units 131-1, 131-2, 131-3 and 131-4, four coupling bars 132-1, 132-2, 132-3 and 132-4, four covers 200-1, 200-2, 200-3 and 200-4, an insulating cylinder 135, and end-surface covers 136 on both ends.

The system unit 131-1 comprises an optical circuit unit 140-1 having an optical circuit component module 210-1, a power-supply circuit unit 212-1 including a power-supply module 211-1, and a control circuit unit 213-1. The optical circuit unit 140-1, the power-supply circuit unit 212-1 and the control circuit unit 213-1 are stacked in this order in a direction X2-X1. Each of the circuit units 140-1, 212-1 and 213-1 is made of metal. A printed board 214-1 for address-setting and adjusting is mounted on the outer surface of the control circuit unit 213-1. In other words, the adjusting/address-setting printed board 214-1 is openly mounted on the control circuit unit 213-1. The control circuit unit 213-1 has a trapezoidal shape when viewed from Y2, and has coupling-bar fixing surfaces 215-1 and 216-1 on both sides. The coupling-bar fixing surfaces 215-1 and 216-1 are inclined in a form of a roof. The other system units 131-2 to 131-4 have the same or symmetrical structure as the above-described system unit 131-1. The adjusting/address-setting printed board 214-1 is properly adjusted, in which an address is set and properties are adjusted.

Figure 1:
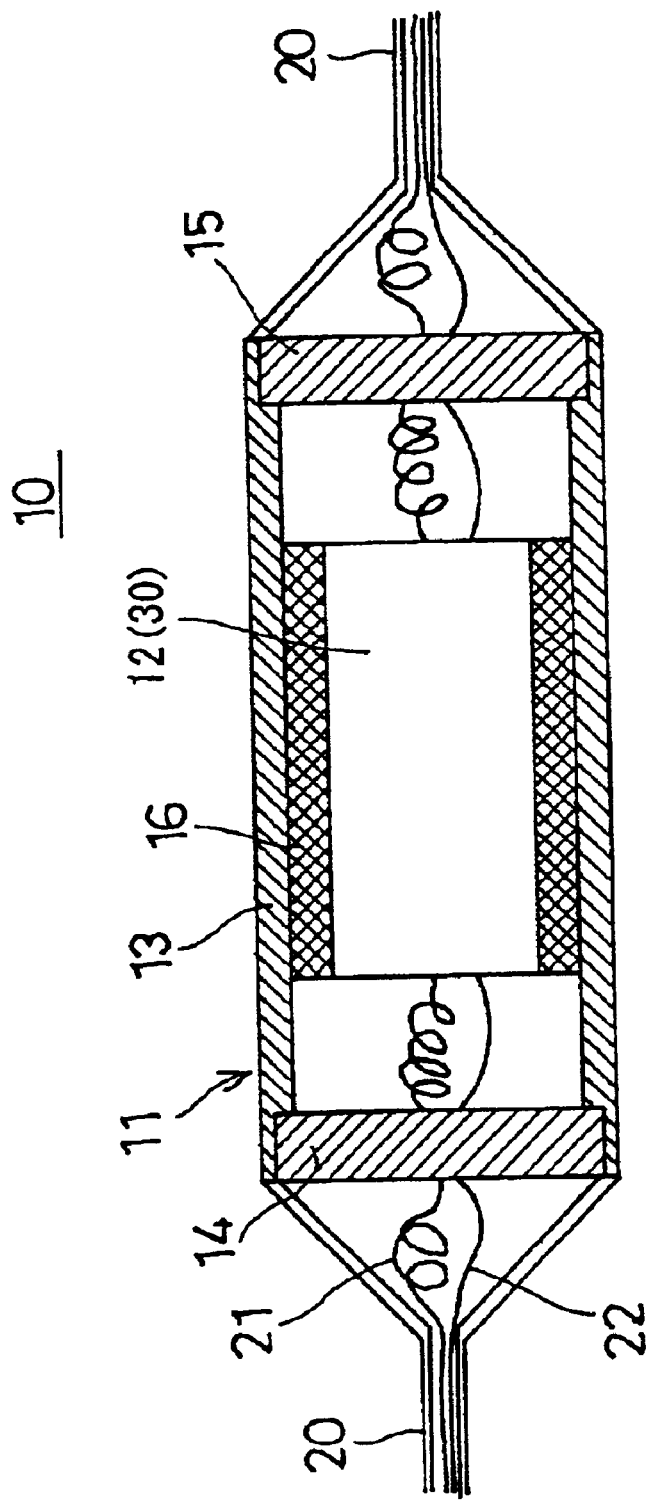
FIG. 1 shows a structure of a submarine repeater.
Figure 2:
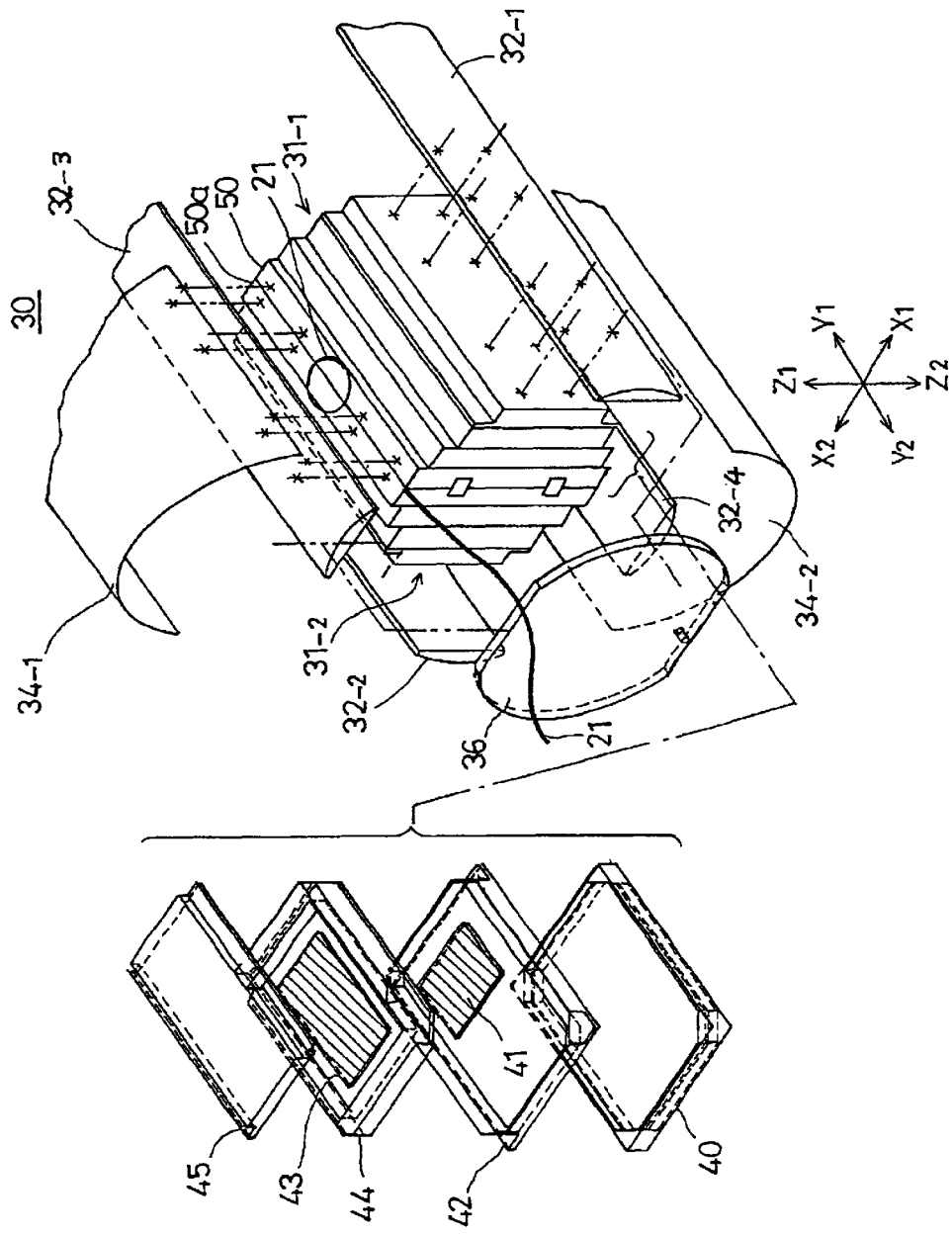
FIG. 2 is a perspective view of a disassembled state of a conventional internal unit.
Figure 3:
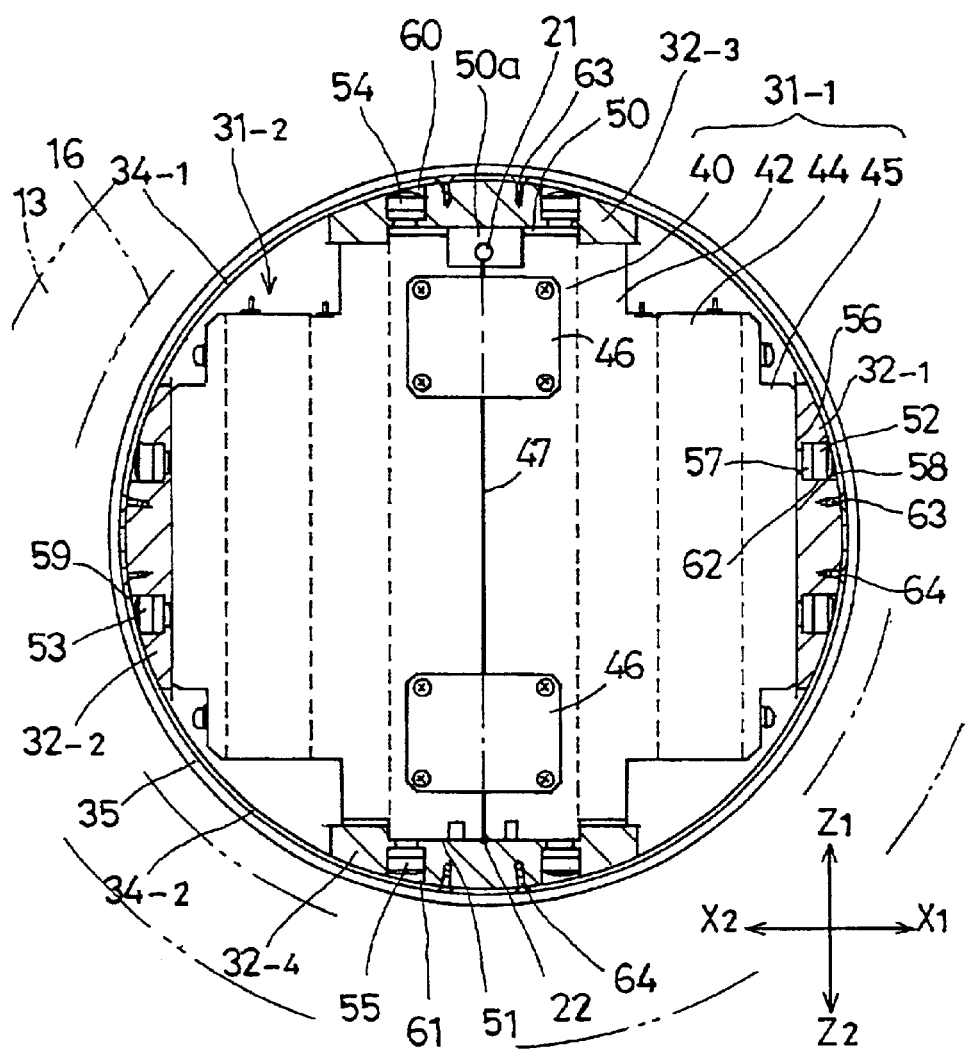
FIG. 3 is a front view of the internal unit shown in FIG. 2.
Figure 4:
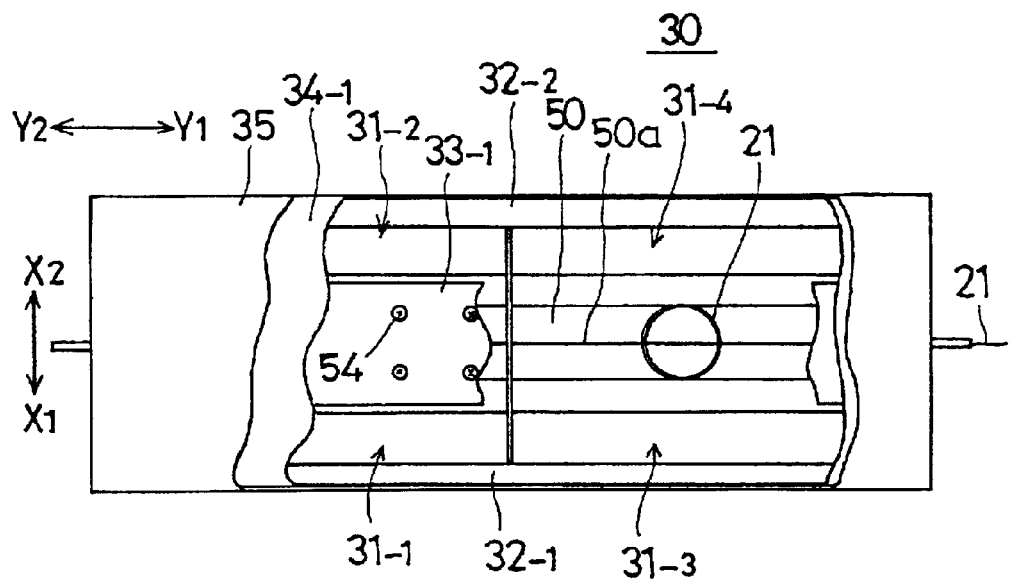
FIG. 4 is a plan view of the internal unit shown in FIG. 2.
Figure 5:
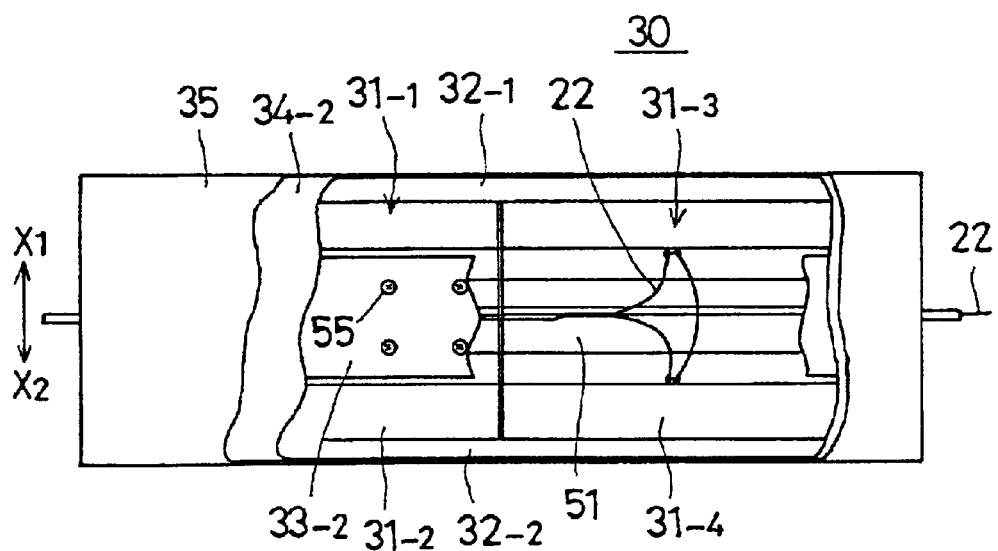
FIG. 5 is a bottom view of the internal unit shown in FIG. 2.
Figure 6:
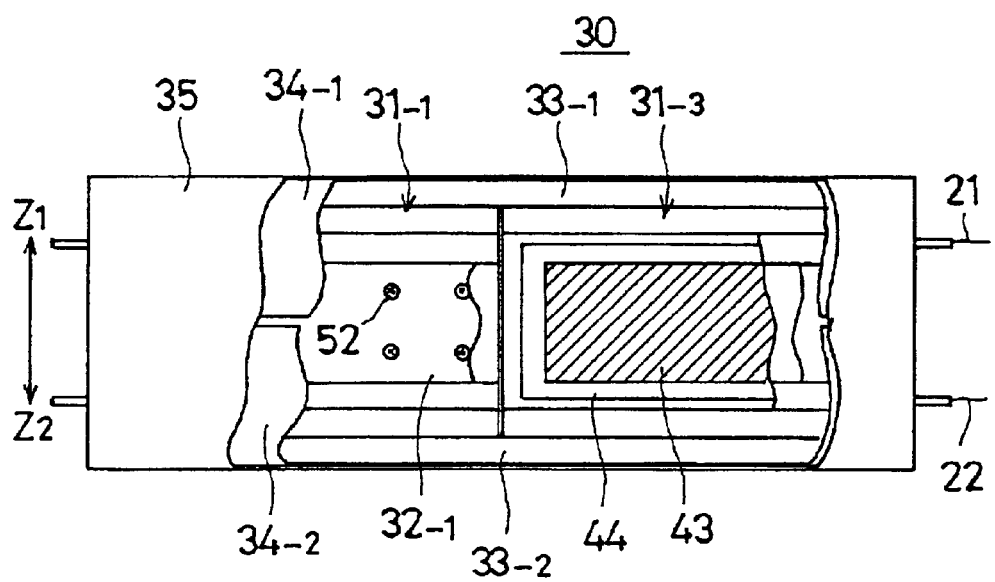
FIG. 6 is a side view of the internal unit shown in FIG. 2.
Figure 7:
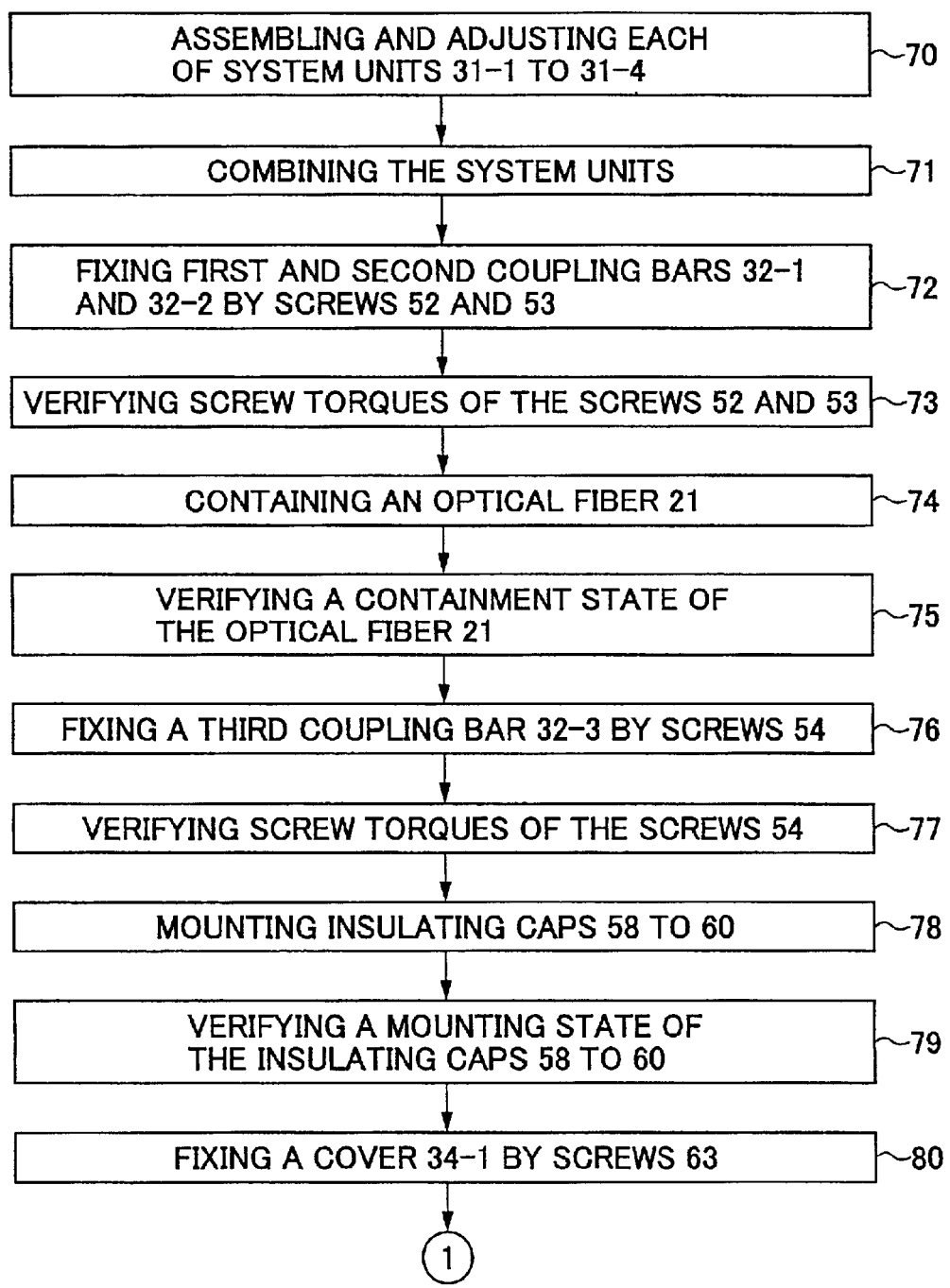
FIG. 7 is a flowchart of steps of assembling the internal unit shown in FIG. 2.
Figure 8:
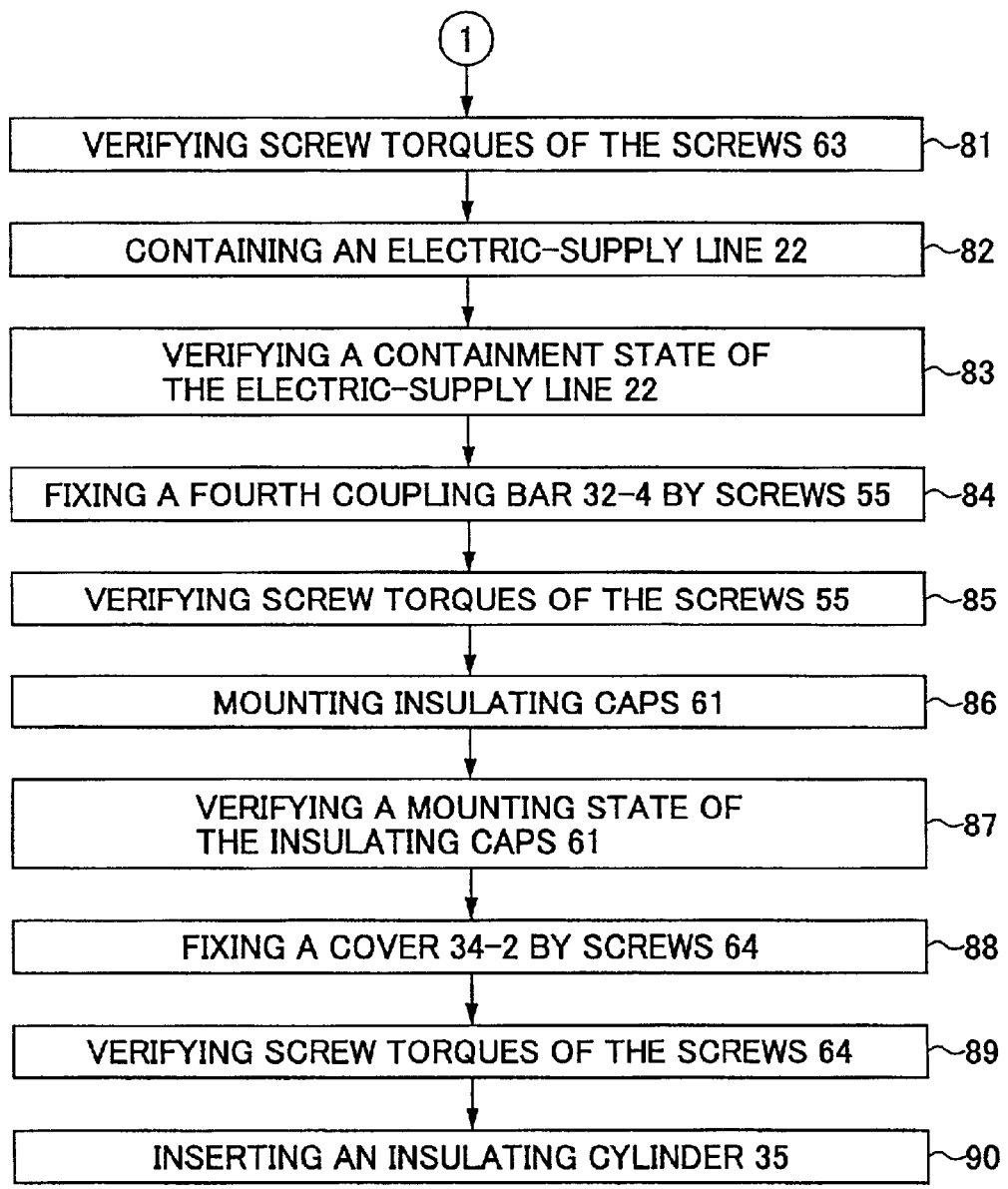
FIG. 8 is a flowchart of steps following the steps shown in FIG. 7.

In this structure according to the present embodiment, since the adjusting/address-setting printed board 214-1 has both functions of adjusting and address-setting, the system unit 131-1 is smaller than the conventional system unit 31-1 shown in FIG. 3. Thus, the internal unit 130 is smaller than the conventional internal unit 30 shown in FIG. 2 and FIG. 3.

The first system unit 131-1 and the second system unit 131-2 are coupled with each other back to back by insulating coupling plates 146 and screws so that the inner surface of the optical circuit unit 140-1 of the first system unit 131-1 and the inner surface of an optical circuit unit 140-2 of the second system unit 131-2 face each other in a direction X1-X2 with an insulating sheet 147 therebetween. Likewise, the third system unit 131-3 and the fourth system unit 131-4 are coupled with each other back to back in the direction X1-X2. The first system unit 131-1 and the third system unit 131-3 are aligned in a direction Y2-Y1, and the second system unit 131-2 and the fourth system unit 131-4 are aligned in the direction Y2-Y1.

Figure 12:
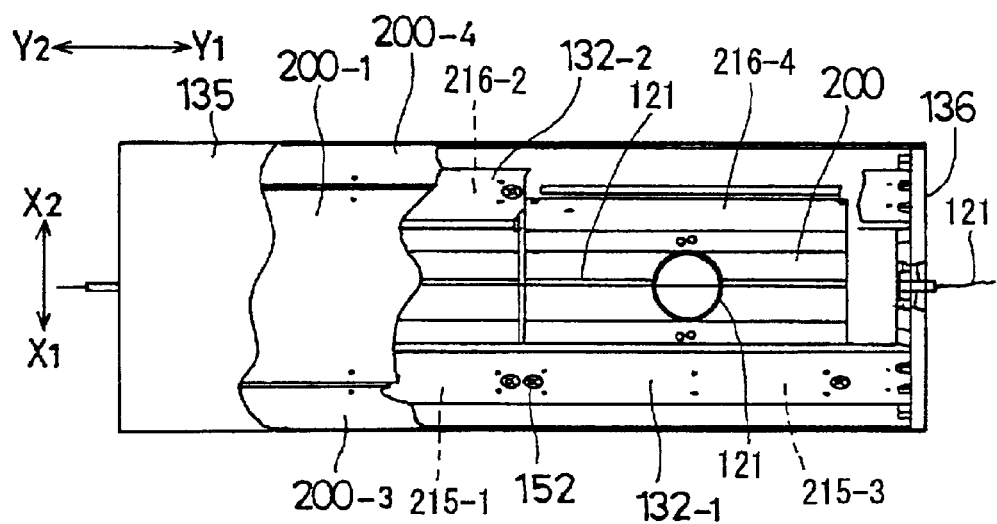
FIG. 12 is a plan view of the internal unit shown in FIG. 10.
Figure 13:
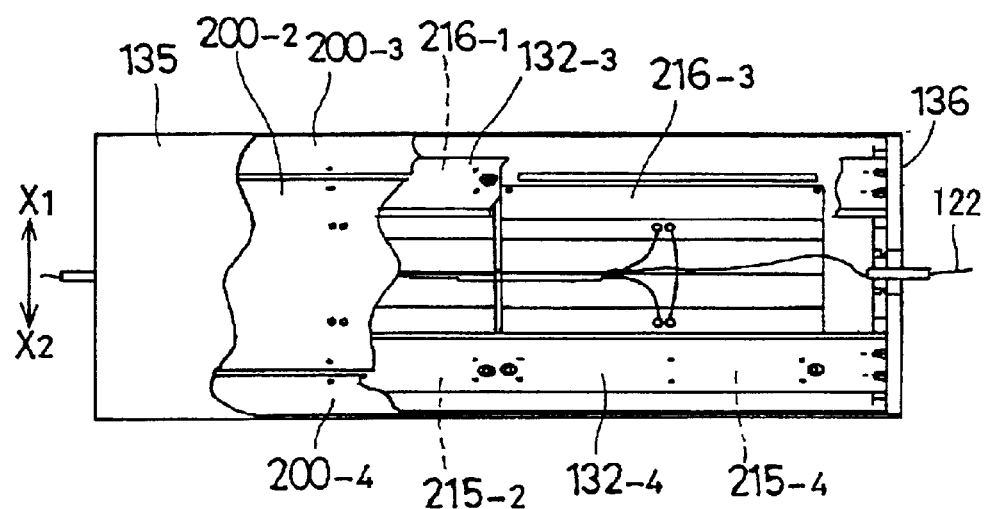
FIG. 13 is a bottom view of the internal unit shown in FIG. 10.
Figure 14:
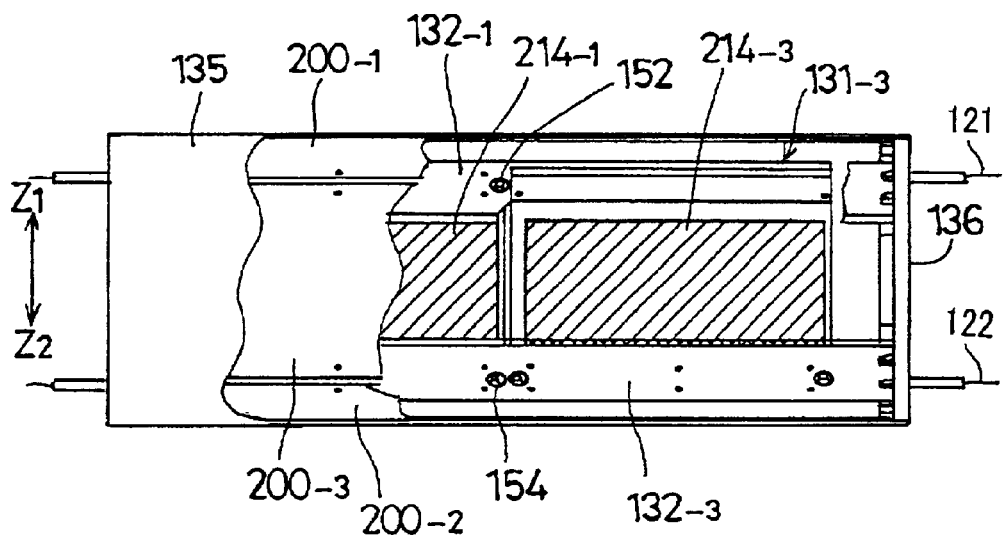
FIG. 14 is a side view of the internal unit shown in FIG. 10.

Shallow grooves 220 and 221 are formed in directions Z1 and Z2, respectively, by side surfaces of the optical circuit units 140 of the system units 131-1 to 131-4 facing each other as described above. As shown in FIG. 12, the optical fiber 121 is wired along the groove 220, and is contained in the groove 220 (an optical-fiber containing portion) with an excess length thereof being processed in the groove 220. As shown in FIG. 13, the electric-supply line 122 is wired along the groove 221 (an electric-supply-line containing portion).

As viewed from Y2, the coupling-bar fixing surface 215-1 is positioned approximately 45 degrees clockwise from the groove 220, and the coupling-bar fixing surface 216-1 is positioned approximately 45 degrees counterclockwise from the groove 221. A coupling-bar fixing surface 216-2 of the second system unit 131-2 is positioned approximately 45 degrees counterclockwise from the groove 220, and a coupling-bar fixing surface 215-2 of the second system unit 131-2 is positioned approximately 45 degrees clockwise from the groove 221.

The coupling bars 132-1 to 132-4 are narrow boards arranged at every 90 degrees so as to couple and fix the system units 131-1 to 131-4 to enhance a vibration resistance and an impact resistance of the internal unit 130, and also have a function of conducting heat outwardly from the system units 131-1 to 131-4.

The first coupling bar 132-1 extends along the coupling-bar fixing surface 215-1 of the first system unit 131-1 and a coupling-bar fixing surface 215-3 of the third system unit 131-3, and is fixed to the coupling-bar fixing surfaces 215-1 and 215-3 by screws 152 with an insulating sheet 156 therebetween. The second coupling bar 132-2 extends along the coupling-bar fixing surface 216-2 of the second system unit 131-2 and a coupling-bar fixing surface 216-4 of the fourth system unit 131-4, and is fixed to the coupling-bar fixing surfaces 216-2 and 216-4 by screws 153. The third coupling bar 132-3 extends along the coupling-bar fixing surface 216-1 of the first system unit 131-1 and a coupling-bar fixing surface 216-3 of the third system unit 131-3, and is fixed to the coupling-bar fixing surfaces 216-1 and 216-3 by screws 154. The fourth coupling bar 132-4 extends along the coupling-bar fixing surface 215-2 of the second system unit 131-2 and a coupling-bar fixing surface 215-4 of the fourth system unit 131-4, and is fixed to the coupling-bar fixing surfaces 215-2 and 215-4 by screws 155.

The first to fourth coupling bars 132-1 to 132-4 are positioned away from the optical fiber 121 and the electric-supply line 122, and are also positioned away from the adjusting/address-setting printed board 214-1 of the first system unit 131-1 and adjusting/address-setting printed boards 214-2 to 214-4 of the second to fourth system units 131-2 to 131-4. Thus, the first to fourth coupling bars 132-1 to 132-4 do not cover the optical fiber 121, the electric-supply line 122, and the adjusting/address-setting printed boards 214-1 to 214-4.

The coupling bars 132-1 and 132-3 and the screws 152 and 154 couple the first and third system units 131-1 and 131-3 with each other. The coupling bars 132-2 and 132-4 and the screws 153 and 155 couple the second and fourth system units 131-2 and 131-4 with each other. Each of the screws 152 to 155 is fastened via an insulating bush 157. Heads of the screws 152 to 155 are covered with insulating caps 158 to 161, respectively. The insulating caps 158 to 161 are inserted into holes 162 for screwing formed in the coupling bars 132-1 to 132-4.

In the system units 131-1 to 131-4, electronic components generating large amounts of heat, such as a laser diode, are placed in the proximity of the coupling bars 132-1 to 132-4 so as to facilitate a radiation of the heat.

Each of the four covers 200-1 to 200-4 has a shape of a quarter cylinder with an opening angle of approximately 90 degrees. Each of the four covers 200-1 to 200-4 lies across adjacent two coupling bars of the coupling bars 132-1 to 132-4 in a circumferential direction, and is fixed to the adjacent two of the coupling bars 132-1 to 132-4 on both sides by screws 163. The cover 200-1 lies across the coupling bars 132-1 and 132-2, and covers the optical fiber 121. The cover 200-2 lies across the coupling bars 132-3 and 132-4, and covers the electric-supply line 122. The cover 200-3 lies across the coupling bars 132-1 and 132-3, and covers the adjusting/address-setting printed boards 214-1 and 214-3. The cover 200-4 lies across the coupling bars 132-2 and 132-4, and covers the adjusting/address-setting printed boards 214-2 and 214-4.

The covers 200-1 to 200-4 are adjacent to each other in the circumferential direction with gaps 201 therebetween. The gaps 201 are formed at positions of the above-mentioned screws 152 to 155.

Fixing the covers 200-1 to 200-4 as above gives a cylindrical shape to the internal unit 130 in the course of being assembled.

The insulating cylinder 135 covers the internal unit 130 in the course of being assembled in which the covers 200-1 to 200-4 are mounted. The insulating cylinder 35 insulates the internal unit 130 from the outer body 113 in a state that the internal unit 130 is incorporated in the outer body 113.

Figure 15:
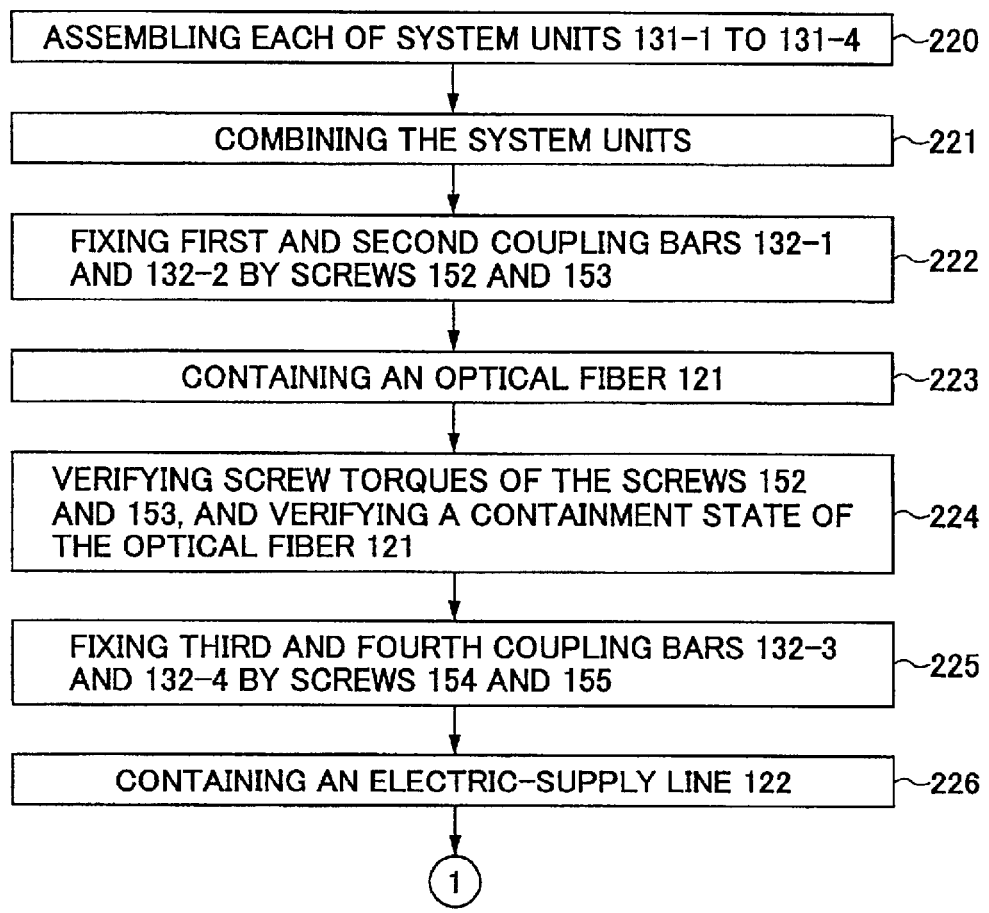
FIG. 15 is a flowchart of steps of assembling the internal unit shown in FIG. 10.
Figure 16:
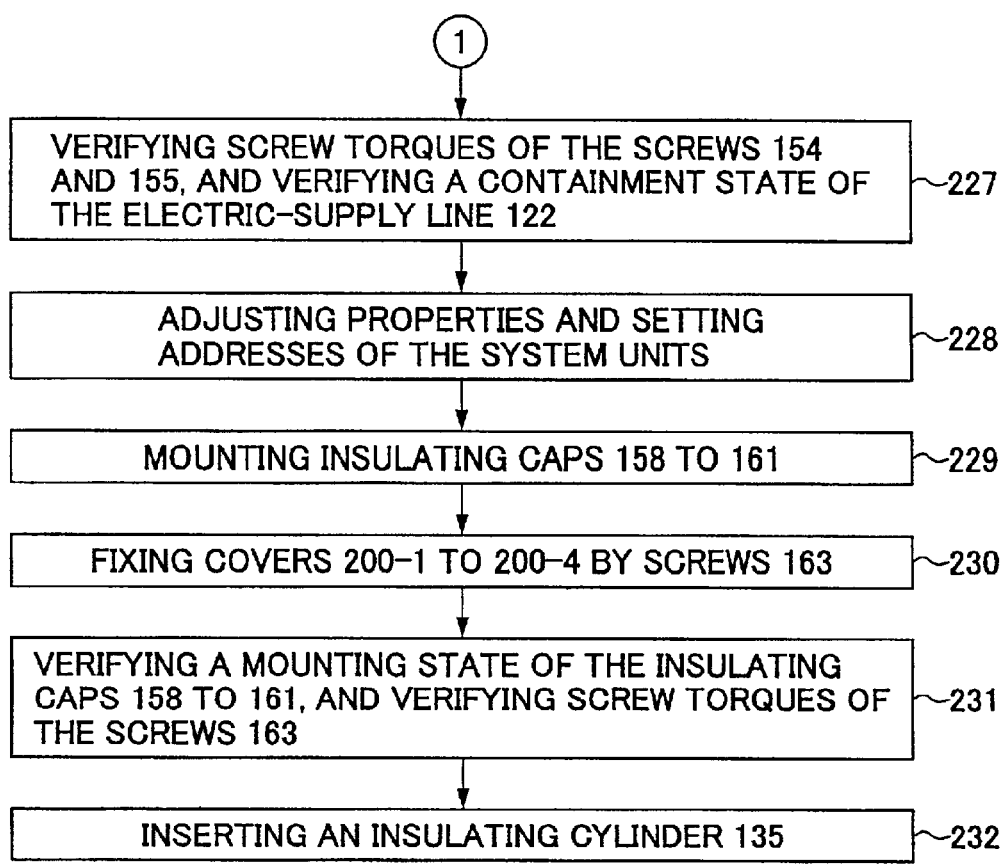
FIG. 16 is a flowchart of steps following the steps shown in FIG. 15.

Next, the internal unit 130 having the above-described structure is assembled as shown in FIG. 15 and FIG. 16. The assembling is performed while being verified by an inspector who is another person from an assembling operator so that reliability thereof is secured.

First, the optical circuit unit 140, the power-supply circuit unit 212 and the control circuit unit 213 are prepared. In the adjusting/address-setting printed board 214 of the control circuit unit 213, an address is not set yet. The optical circuit unit 140, the power-supply circuit unit 212 and the control circuit unit 213 are stacked so as to form each of the system units 131-1 to 131-4. Properties thereof are not adjusted yet (step 220). Since the addresses are not set yet, and the properties are not adjusted yet, it does not require much labor to assemble each of the system units 131-1 to 131-4.

Next, the first system unit 131-1 and the second system unit 131-2 are combined to each other by the coupling plates 146, back to back, i.e., in such a manner that the inner surface of the optical circuit unit 140-1 of the first system unit 131-1 and the inner surface of the optical circuit unit 140-2 of the second system unit 131-2 face each other. Likewise, the third system unit 131-3 and the fourth system unit 131-4 are combined to each other back to back by the coupling plates 146 (step 221).

Since the addresses are not set yet, and the properties are not adjusted yet, the system units 131-1 to 131-4 may be combined arbitrarily.

Then, the first coupling bar 132-1 and the second coupling bar 132-2 are fixed by the screws 152 and 153 (step 222).

Figure 17:
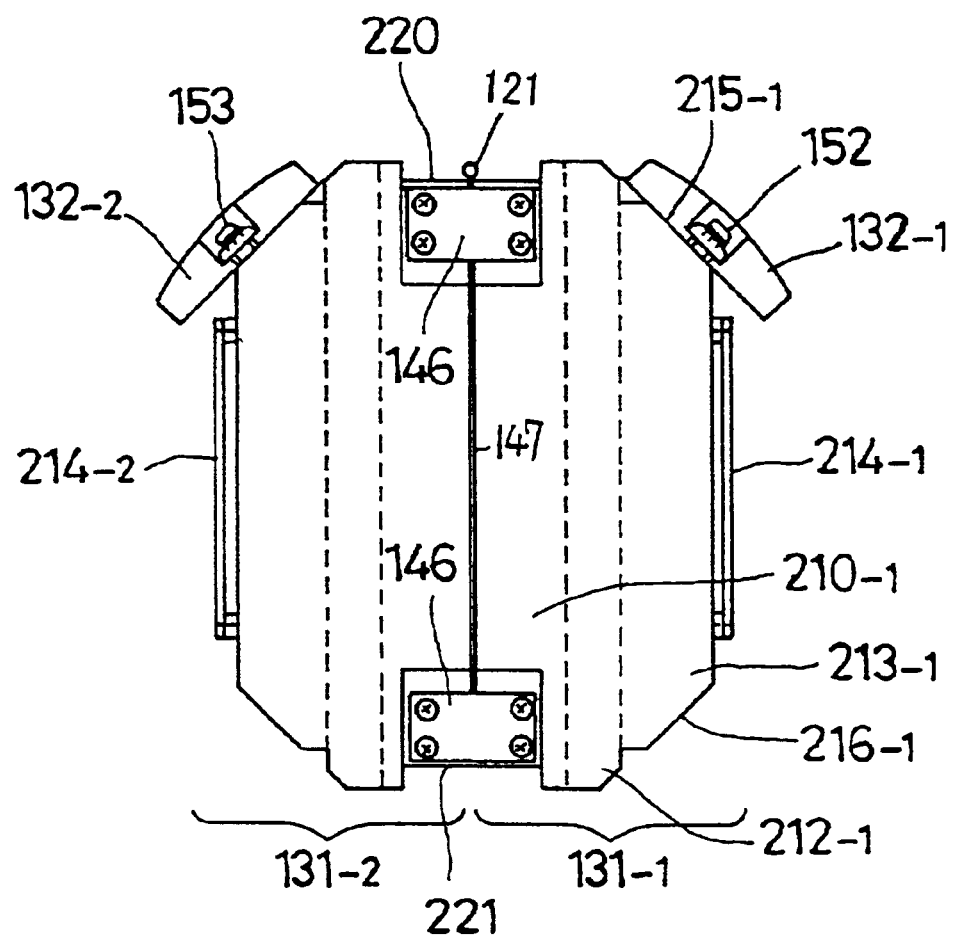
FIG. 17 is a front view showing a state of the internal unit after a step 223 shown in FIG. 15 is finished.

Next, the optical fiber 121 is contained along the groove 220 (step 223). FIG. 17 shows a state of the internal unit 130 after the step 223 is finished.

Subsequently, screw torques of the screws 152 and 153 are verified, and a containment state of the optical fiber 121 is verified (step 224).

Then, the third coupling bar 132-3 and the fourth coupling bar 132-4 are fixed by the screws 154 and 155 (step 225).

Next, the electric-supply line 122 is contained along the groove 221 (step 226).

Figure 18:
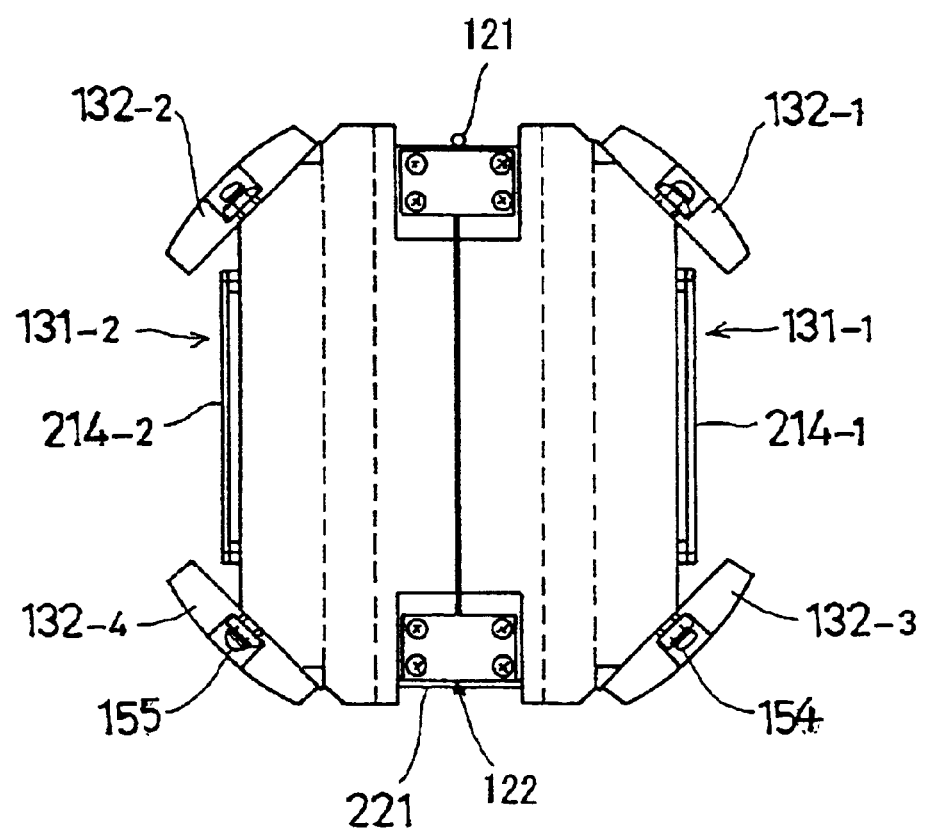
FIG. 18 is a front view showing a state of the internal unit after a step 226 shown in FIG. 15 is finished.

FIG. 18 shows a state of the internal unit 130 after the step 226 is finished. The above-mentioned steps 225 and 226 are performed by overturning the internal unit 130 in the course of being assembled.

Subsequently, screw torques of the screws 154 and 155 are verified, and a containment state of the electric-supply line 122 is verified (step 227).

Then, the adjusting/address-setting printed boards 214-1 to 214-4, which are exposed on both sides of the internal unit 130 in the course of being assembled, are adjusted so as to adjust the properties of the system units 131-1 to 131-4 and to set the addresses thereof (step 228).

Next, the insulating caps 158 to 161 are mounted by inserting (step 229).

Figure 19:
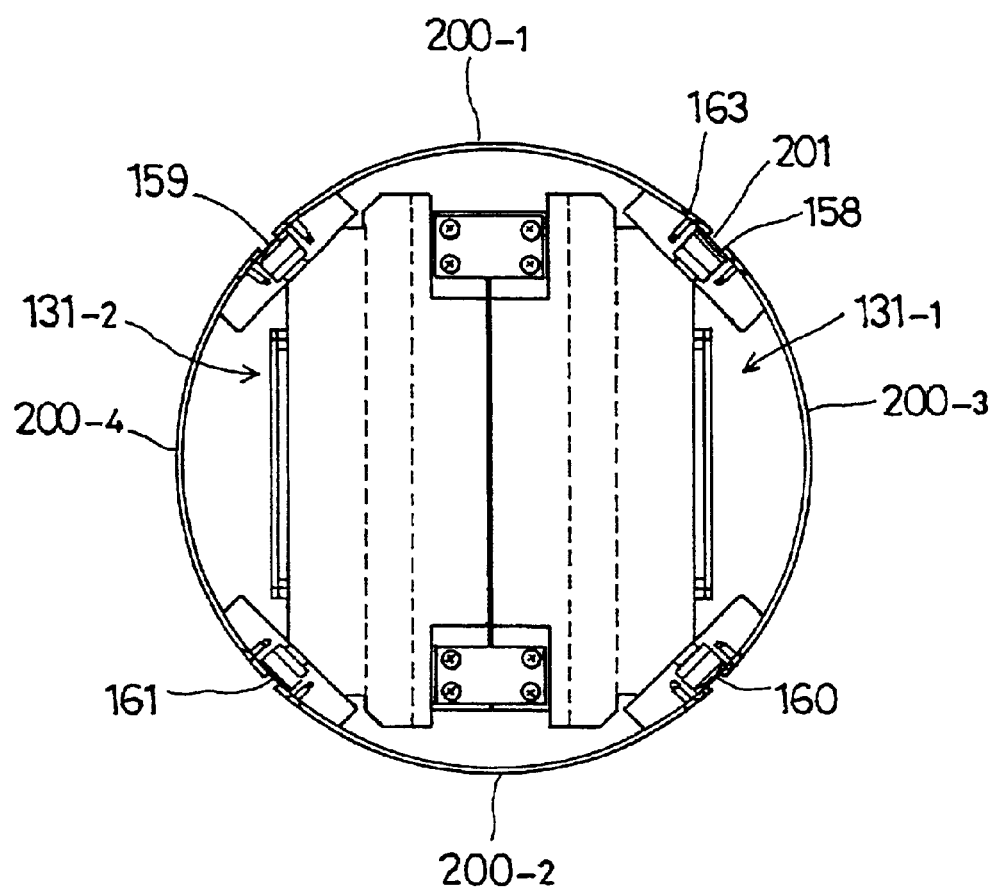
FIG. 19 is a front view showing a state of the internal unit after a step 230 shown in FIG. 15 is finished.

Then, the four covers 200-1 to 200-4 are fixed by the screws 163 (step 230). FIG. 19 shows a state of the internal unit 130 after the step 230 is finished.

Subsequently, a mounting state of the insulating caps 158 to 161 is verified, and screw torques of the screws 163 are verified (step 231). The mounting state of the insulating caps 158 to 161 is verified through the gaps 201.

Finally, the insulating cylinder 135 is inserted (step 232).

Hereinafter, a description will be given of features of the above-described structure and the assembling steps of the internal unit 130.

(1) The number of times the assembling steps are suspended in the course of assembling the internal unit 130 is reduced to half, in comparison with a conventional internal unit.

Since the verifying steps are performed by an inspector who is another person from an assembling operator as mentioned above, each time the verifying step is performed, the assembling steps are suspended.

As shown in FIG. 15 and FIG. 16, the verifying step 224 comes after the two assembling steps 222 and 223, the verifying step 227 comes after the two assembling steps 225 and 226, and the verifying step 231 comes after the two assembling steps 229 and 230. Thus, the number of times the assembling steps are suspended in the course of assembling is reduced to half, in comparison with a conventional case in which one verifying step comes after one assembling step. This shortens manufacturing moves of the internal unit 130, and thus, the internal unit 130 can be assembled in a short period of time, compared to a conventional internal unit.

(2) The internal unit 130 is assembled in flexible manners.

System parameters, such as an output power and an address of a system unit, are determined according to a contract with a customer. As described above, the internal unit 130 has a structure that allows the adjustment of the properties and the setting of the addresses of the system units 131-1 to 131-4 to be performed in the course of the assembling. Therefore, even when details of the system parameters are not determined yet, the assembling of the internal unit 130 can be started and be performed to the step 227. In other words, the internal unit 130 can be produced and stored in stock, in which the internal unit 130 is assembled to a state before the step 228. Then, after making a contract with a customer, the assembling of the internal unit 130 can be resumed from the step 228. Hence, it takes a short period of time to complete the internal unit 130 after making the contract with the customer.

In addition, the adjustment of the properties and the setting of the addresses are performed all at once with respect to the system units 131-1 to 131-4 arranged neatly in the above-mentioned order. Therefore, the adjustment of the properties and the setting of the addresses are easy to perform, compared to system units not neatly arranged.

Further, since the adjusting/address-setting printed boards 214-1 to 214-4 are exposed outwardly in a state of the internal unit 130 in which the system units 131-1 to 131-4 are coupled by the coupling bars 132-1 to 132-4, the assembling operator can access the adjusting/address-setting printed boards 214-1 to 214-4 from outside of the internal unit 130 in that state. Therefore, in the state of the internal unit 130 in which the system units 131-1 to 131-4 are coupled by the coupling bars 132-1 to 132-4, the properties can be readjusted and the addresses can be reset. Hence, even when details of the contract with the customer are changed in the course of assembling the internal unit 130, the internal unit 130 does not need to be disassembled, let alone be reassembled. This prevents lengthening manufacturing moves of the internal unit 130, and thus, the internal unit 130 can be completed in a short period of time.

Besides, the present invention is not limited to the above-mentioned submarine repeater 110, but also is applicable to a submarine branching unit diverging information, or a gain equalizer.

That is, the present invention is not limited to the specifically disclosed embodiments, and variations and modifications may be made without departing from the scope of the present invention.

The present application is based on Japanese priority application No. 2001-135502 filed on May 2, 2001, the entire contents of which are hereby incorporated by reference.

What is claimed is:

1. An internal unit incorporated in a body of a submarine apparatus, the unit comprising:
    a plurality of system units placed in a predetermined arrangement, the system units including at least one electronic-circuit printed board having a part to be adjusted; and
    coupling bars coupling cover members which cover the plurality of system units, said coupling bars fixed to coupling-bar fixing surfaces of said system units by screws so as to couple said system units in said predetermined arrangement,
    wherein said coupling-bar fixing surfaces are located at positions shifted from said electronic-circuit printed board.

2. An internal unit incorporated in a body of a submarine apparatus, the unit comprising:
    a plurality of system units placed in a predetermined arrangement, the system units including an optical-fiber containing portion containing an optical fiber, an electric-supply-line containing portion containing an electric-supply line, and at least one electronic-circuit printed board having a part to be adjusted; and
    coupling bars coupling cover members which cover the plurality of system units, said coupling bars fixed to coupling-bar fixing surfaces of said system units by screws so as to couple said system units in said predetermined arrangement,
    wherein said coupling-bar fixing surfaces are located at positions shifted from said optical-fiber containing portion, said electric-supply-line containing portion, and said electronic-circuit printed board.

3. The internal unit as claimed in claim 1, wherein each of said system units has inclined surfaces on both sides thereof; and
    said inclined surfaces form paid coupling-bar fixing surfaces.

4. The internal unit as claimed in claim 2, wherein each of said system units has inclined surfaces on both sides thereof; and
    said inclined surfaces form paid coupling-bar fixing surfaces.

5. The internal unit as claimed in claim 1, further comprising a plurality of covers fixed to said coupling bars by screws so that each of said covers lies across the coupling bars adjacent in a circumferential direction,
    wherein the covers adjacent in the circumferential direction are placed so as to form a gap therebetween, the gap being located at a position opposing each of said screws fixing said coupling bars.

6. The internal unit as claimed in claim 2, further comprising a plurality of covers fixed to said coupling board by screws so that each of said covers lies across the coupling bars adjacent in a circumferential direction,
    wherein the covers adjacent in the circumferential direction are placed so as to form a gap therebetween, the gap being located at a position opposing each of said screws fixing said coupling bars.

7. The internal unit as claimed in claim 1, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and
    said control circuit unit includes a printed board used for adjusting and address-setting mounted on an outer surface thereof.

8. The internal unit as claimed in claim 2, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and
    said control circuit unit includes a printed board used for adjusting and address-setting mounted on an outer surface thereof.

9. The internal unit as claimed in claim 3, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and
    said control circuit unit includes a printed board used for adjusting and address-setting mounted on an outer surface thereof.

10. The internal unit as claimed in claim 4, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and
    said control circuit unit includes a printed board used for adjusting and address-setting mounted on an outer surface thereof.

11. The internal unit as claimed in claim 5, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and said control circuit unit includes a printed board used for adjusting and address-setting mounted on an outer surface thereof.

12. The internal unit as claimed in claim 6, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and said control circuit unit includes a printed board used for adjusting and address-setting mounted on an outer surface thereof.

13. The internal unit as claimed in claim 1, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has trapezoidal shape when viewed in a longitudinal direction so as to form said coupling-bar fixing surfaces on both sides thereof, the coupling-bar fixing surfaces being inclined in a form of a roof.

14. The internal unit as claimed in claim 2, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has a trapezoidal shape when viewed in a longitudinal direction so as to form said coupling-bar fixing surfaces on both sides thereof, the coupling-bar fixing surfaces being inclined in a form of a roof.

15. The internal unit as claimed in claim 3, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has a trapezoidal shape when viewed in a longitudinal direction so as to form said coupling-bar fixing surfaces on both sides thereof, the coupling-bar fixing surfaces being inclined in a form of a roof.

16. The internal unit as claimed in claim 4, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has trapezoidal shape when viewed in a longitudinal direction so as to form said coupling-bar fixing surfaces on both sides thereof, the coupling-bar fixing surfaces being inclined in a form of a roof.

17. The internal unit as claimed in claim 5, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has a trapezoidal shape when viewed in a longitudinal direction so as to form said coupling-bar fixing surfaces on both sides thereof, the coupling-bar fixing surfaces being inclined in a form of a roof.

18. The internal unit as claimed in claim 6, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has trapezoidal shape when viewed in a longitudinal direction so as to form said coupling-bar fixing surfaces on both sides thereof, the coupling-bar fixing surfaces being inclined in a form of a roof.

19. A submarine apparatus comprising:

a cylindrical airtight body; and an internal unit incorporated in said body, the internal unit including:

a plurality of system units placed in a predetermined arrangement, the system units including at least one electronic-circuit printed board having a part to be adjusted; and coupling bars coupling cover members which cover the plurality of system units, said coupling bars fixed to coupling-bar fixing surfaces of said system units by screws so as to couple said system units in said predetermined arrangement, wherein said coupling-bar fixing surfaces are located at positions shifted from said electronic-circuit printed board.

20. A submarine apparatus comprising:

a cylindrical airtight body; and an internal unit incorporated in said body, the internal unit including:

a plurality of system units placed in a predetermined arrangement, the system units including an optical-fiber containing portion containing an optical fiber, an electric-supply-line containing portion containing an electric-supply line, and at least one electronic-circuit printed board having a part to be adjusted and coupling bars coupling cover members which cover the plurality of system units, said coupling bars fixed to coupling-bar fixing surfaces of said system units by screws so as to couple said system units in said predetermined arrangement, wherein said coupling-bar fixing surfaces are located at positions shifted from said optical-fiber containing portion, said electric-supply-line containing portion, and said electronic-circuit printed board.

21. The submarine apparatus as claimed in claim 19, wherein each of said system units has inclined surfaces on both sides thereof; and said inclined surfaces form and coupling-bar fixing surfaces.

22. The submarine apparatus as claimed in claim 20, wherein each of said system units has inclined surfaces on both sides thereof; and said inclined surfaces form and coupling-bar fixing surfaces.

23. The submarine apparatus as claimed in claim 19, further comprising a plurality of covers fixed to said coupling bars by screws so that each of said covers lies across the coupling bars adjacent in a circumferential direction, wherein the covers adjacent in the circumferential direction are placed so as to form a gap therebetween, the gap being located at a position opposing each of said screws fixing said coupling bars.

24. The submarine apparatus as claimed in claim 20, further comprising a plurality of covers fixed to said coupling bars by screws so that each of said covers lies across the coupling bars adjacent in a circumferential direction, wherein the covers adjacent in the circumferential direction are placed so as to form a gap therebetween, the gap being located at a position opposing each of said screws fixing said coupling bars.

25. The submarine apparatus as claimed in claim 19, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and said control circuit unit includes a printed board used for adjusting and address-setting mounted on an outer surface thereof.

26. The submarine apparatus as claimed in claim 20, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and said control circuit unit includes a printed board used for adjusting and address-setting mounted on an outer surface thereof.

27. The submarine apparatus as claimed in claim 21, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and said control circuit unit includes a printed board used for adjusting and address-setting mounted on an outer surface thereof.

28. The submarine apparatus as claimed in claim 22, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and said control circuit unit includes a printed board used for adjusting and address-setting mounted on an outer surface thereof.

29. The submarine apparatus as claimed in claim 23, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and said control circuit unit includes a printed board used for adjusting and address-setting mounted on an outer surface thereof.

30. The submarine apparatus as claimed in claim 24, wherein each of said system units comprises an optical circuit unit including an optical circuit component module, a power-supply circuit unit including a power-supply module, and a control circuit unit, the optical circuit unit, the power-supply circuit unit and the control circuit unit being stacked on each other, and said control circuit unit includes a printed board used for adjusting and address-setting mounted on an outer surface thereof.

31. The submarine apparatus as claimed in claim 19, wherein each of said system units comprises an optical circuit unit including an optical circuit unit including an optical circuit component module, a power-supply circuit unit including a power-supply module, and a control circuit unit, the optical circuit unit, the power-supply circuit unit and the control circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has a trapezoidal shape when viewed in a longitudinal direction so as to form said coupling-bar fixing surfaces on both sides thereof, the coupling-bar fixing surfaces being inclined in a form of a roof.

32. The submarine apparatus as claimed in claim 20, wherein each of said system units comprises an optical circuit unit including an optical circuit unit including an optical circuit component module, a power-supply circuit unit including a power-supply module, and a control circuit unit, the optical circuit unit, the power-supply circuit unit and the control circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has trapezoidal shape when viewed in a longitudinal direction so as to form said coupling-bar fixing surfaces on both sides thereof, the coupling-bar fixing surfaces being inclined in a form of a roof.

33. The submarine apparatus as claimed in claim 21, wherein each of said system units comprises an optical circuit unit including an optical circuit unit including an optical circuit component module, a power-supply circuit unit including a power-supply module, and a control circuit unit, the optical circuit unit, the power-supply circuit unit and the control circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has a trapezoidal shape when viewed in a longitudinal direction so as to form said coupling-bar fixing surfaces on both sides thereof, the coupling-bar fixing surfaces being inclined in a form of a roof.

34. The submarine apparatus as claimed in claim 22, wherein each of said system units comprises an optical circuit unit including an optical circuit unit including an optical circuit component module, a power-supply circuit unit including a power-supply module, and a control circuit unit, the optical circuit unit, the power-supply circuit unit and the control circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has a trapezoidal shape when viewed in a longitudinal direction so as to form said coupling-bar fixing surfaces on both sides thereof, the coupling-bar fixing surfaces being inclined in a form of a roof.

35. The submarine apparatus as claimed in claim 23, wherein each of said system units comprises an optical circuit unit including an optical circuit unit including an optical circuit component module, a power-supply circuit unit including a power-supply module, and a control circuit unit, the optical circuit unit, the power-supply circuit unit and the control circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has a trapezoidal shape when viewed in a longitudinal direction so as to form said coupling-bar fixing surfaces on both sides thereof, the coupling-bar fixing surfaces being inclined in a form of a roof.

36. The submarine apparatus as claimed in claim 24, wherein each of said system units comprises an optical circuit unit including an optical circuit unit including an optical circuit component module, a power-supply circuit unit including a power-supply module, and a control circuit unit, the optical circuit unit, the power-supply circuit unit and the control circuit unit including a power-supply module, and a control circuit unit, the optical circuit unit, the power-supply circuit unit and the control circuit unit being stacked on each other, said control circuit unit includes a printed board used for adjusting and address-setting mounted on an outer surface thereof, and said control circuit unit has a trapezoidal shape when viewed in a longitudinal direction so as to form said coupling-bar fixing surfaces on both sides thereof, the coupling-bar fixing surfaces being inclined in a form of a roof.

37. A method comprising:

assembling and adjusting a plurality of system units in a predetermined arrangement of a submarine apparatus for amplifying optical signals;

fixing a first and a second coupling bar to a first and a second coupling-bar fixing surface of the plurality of system units, respectively;

fixing a third and a fourth coupling bar to a third and a fourth coupling-bar fixing surface of the plurality of system units, respectively, thereby forming an internal unit of the submarine apparatus;

adjusting properties and settings of the plurality of system units;

coupling cover members to the internal unit through the coupling bars forming a covered internal unit; and inserting the covered internal unit into an insulating cylinder.

38. The method according to claim 37, wherein the insulating cylinder comprises a cylindrical airtight body.

39. The method according to claim 37, wherein the system units include an optical-fiber containing portion containing an optical fiber, an electric-supply-line containing portion containing an electric-supply line, and at least one adjustable electronic-circuit printed board.

40. The method according to claim 39, wherein the coupling-bar fixing surfaces are located at positions shifted from the optical fiber containing portion, the electric-supply-line containing portion, and the electronic-circuit printed board.

* * * * *

UNITED STATES PATENT AND TRADEMARK OFFICE
CERTIFICATE OF CORRECTION

PATENT NO. : 6,775,442 B2
DATED : August 10, 2004
INVENTOR(S) : Yasushi Kaeriyama et al.

It is certified that error appears in the above-identified patent and that said Letters Patent is hereby corrected as shown below:

Column 12,
Lines 4 and 9, change "paid" to -- said --
Line 20, change "board" to -- bars --

Column 14,
Line 64, insert -- ; -- after the word "adjusted"

Column 15,
Line 16, change "and" to -- said --

Signed and Sealed this

Twenty-fifth Day of January, 2005

JON W. DUDAS
*Director of the United States Patent and Trademark Office*